(No Model.)

C. B. WEBSTER.
CULTIVATOR AND PLANTER.

No. 598,039. Patented Jan. 25, 1898.

WITNESSES
W. A. Schoenborn
A. M. Mason

INVENTOR,
Charles B. Webster,
by John Wedderburn
Attorney

UNITED STATES PATENT OFFICE.

CHARLES B. WEBSTER, OF AMENIA, NORTH DAKOTA.

CULTIVATOR AND PLANTER.

SPECIFICATION forming part of Letters Patent No. 598,039, dated January 25, 1898.

Application filed August 4, 1896. Serial No. 601,648. (No model.)

*To all whom it may concern:*

Be it known that I, CHARLES B. WEBSTER, a citizen of the United States, residing at Amenia, in the county of Cass and State of North Dakota, have invented certain new and useful Improvements in Cultivators and Planters; and I do hereby declare the following to be a full, clear, and exact description of the invention, such as will enable others skilled in the art to which it appertains to make and use the same.

This invention relates to certain new and useful improvements in cultivators and planters; and it has for its object, among others, to provide a simple and cheap device for this purpose, whereby better results are accomplished with less labor on the part of the attendant and less danger of the parts becoming injured or rendered inoperative. The main shaft is provided with cups arranged beneath the feed-hoppers, which are supported stationarily over the frame, with their bottoms over the cups or pockets in the shaft. Suitable clutch mechanism is provided under the control of the lever pivoted on the frame of the machine, whereby the shaft is caused to turn with the driving-wheels, or said wheels can be turned independently.

The furrow opening and closing shovels are carried by beams disposed longitudinally on the machine and pivotally mounted or suspended from the frame, their rear ends being connected by a bar H, which in turn is connected with the operative lever, whereby all of the shovels may be raised or lowered simultaneously to regulate their depth of cut.

Every object and advantage of the invention will hereinafter appear, and the novel features thereof will be pointed out in the appended claims.

The invention consists in the various matters hereinafter described and claimed.

The invention is clearly illustrated in the accompanying drawings, which, with letters of reference marked thereon, form a part of the specification, and in which—

Figure 1:
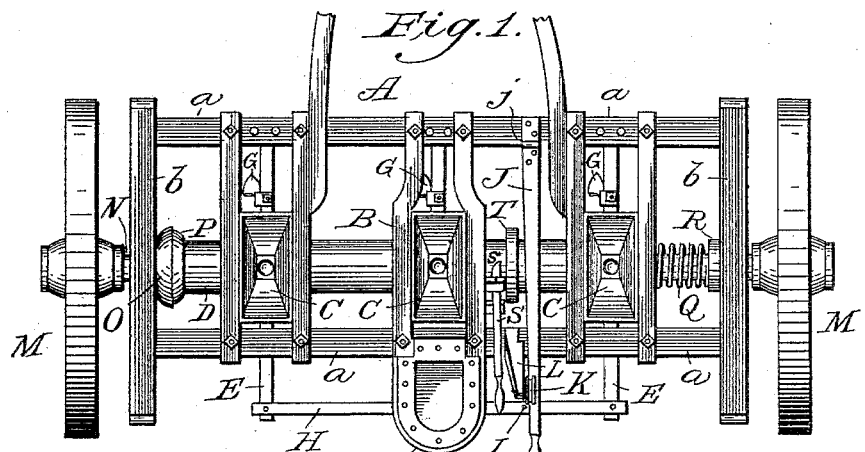
Figure 2:
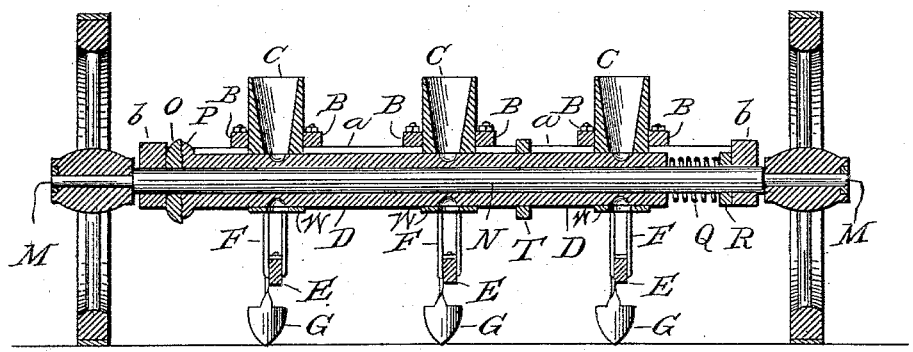
Figures 3, 4:
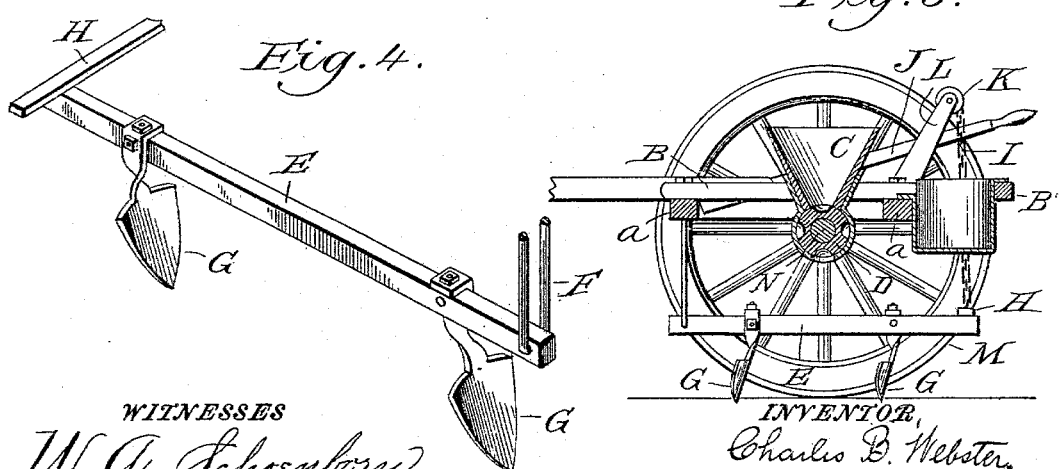

Figure 1 is a plan view of my improved cultivator. Fig. 2 is a vertical transverse section throughout the same. Fig. 3 is a vertical longitudinal section. Fig. 4 is a detail showing the manner of adjusting the shovels.

Like letters of reference indicate like parts throughout the same views.

Referring now to the details of the drawings by letter, A designates the frame, consisting of the transverse timbers $a$, joined by the longitudinal pieces $b$. At suitable points in the frame the timbers $a$ $a$ are connected by the timbers B B, and between these timbers are supported the seedboxes C, which may be connected thereto in any suitable manner and have inclined sides or walls to open at the bottom. These seedboxes are arranged over the pockets or the cups formed about the hollow shaft or sleeve over the axle D, so that as the shaft or sleeve is revolved the seed from the boxes is taken up in these cups or pockets and in the further rotation of the shaft dropped to the ground.

E are arms or bars pivotally mounted at their forward ends from the front cross-timber $a$ by bolts or hinges F, and to these bars or arms are secured any desired number of shovels G. The other ends of these bars or timbers are connected by the bars or rods H or by any suitable form of connection, preferably a flexible one, so as to avoid injury to any of the parts during the operation of the machine. This bar H is connected by a chain or cord I with the lever J, which is pivotally mounted at its other end, as at $j$, on one of the timbers of the frame, and this chain or cord passes over the groove-pulley K, mounted on the standard L, rising from the other timber $a$ of the frame, so that by manipulation of the said lever all of the shovels can be raised or lowered simultaneously. There may be as many of these arms E as desired and each may carry two or more shovels, as may be preferred.

Journaled in the side pieces $b$ of the frame is an axle N, extending beneath the hoppers C. Just inside of the side pieces $b$ are collars O and R, respectively, upon the axle, said collars serving to prevent lateral movement of the frame along the axle, and consequently preventing the jamming of the frame against the wheel-hubs and thus retarding the movement of the vehicle. The hollow shaft or sleeve D, surrounding the axle, has upon one of its ends a disk P, adapted to engage with the collar or disk O upon the axle. These two engaging disks have their engaging surfaces suitably roughened. Between the end of the sleeve or hollow shaft opposite the engaging disks and the collar R is interposed a spring Q, which surrounds the axle, said spring thus binding and normally holding the clutch-disks O and P in engagement.

S is a lever pivotally mounted, as at s, on the frame and its lower end adapted to engage the collar T on the shaft D to throw the said shaft endwise against the tension of the spring.

The central bars B B are extended, and by the curved piece B' constitute a seat or means for receiving the same.

With the parts constructed and arranged substantially as above described the operation is as follows: The seed is placed in the hoppers or seedboxes, and as the wheels revolve the shaft D is rotated with the axle, and the seed taken up by the pockets or cups is carried around and delivered through the delivery-opening on the other side. These delivery-openings are preferably formed in the bands W, encircling the shaft loosely, their ends being secured to the ends of the hopper or seedboxes. When it is desired to stop the flow of the seed, and consequently the rotation of the shaft D, the lever S is moved on its pivot to engage collar T to move shaft D endwise on the axle N against the tension of the spring and throw the clutch-disks out of operative engagement.

Modifications in detail may be resorted to without departing from the spirit of the invention or sacrificing any of its advantages.

What is claimed as new is—

1. A planter or the like comprising a frame, hoppers supported therein, an axle upon said frame below the hoppers, wheels upon said axle, a sleeve surrounding said axle, said sleeve being provided with pockets in line with the hoppers, means for locking the sleeve and axle to rotate one with the other, and means for throwing said sleeve laterally upon the axle and carrying the same out of engagement with the clutch mechanism, substantially as described.

2. A planter or the like comprising a frame, hoppers thereon, an axle supported upon said frame in line with the hoppers, a sleeve slidable upon said axle, said sleeve having pockets in line with the hoppers, a clutch-collar upon the axle, a corresponding clutch upon the inner end of the sleeve, a sleeve between the outer end of the spring and the fixed members whereby the clutches are normally held together, and means for throwing the sleeve along the axle to disengage the clutches, substantially as described.

3. A planter or the like comprising a frame having side bars, hoppers upon said frame, an axle journaled in said side bars in line with the hoppers, collars upon said axle inside of and adjacent to said frames whereby lateral movement between the frame and axle is prevented, one of said collars having its face roughened to form a clutch member, a sleeve slidable upon said axle, said sleeve being provided with pockets in line with the hoppers, a clutch-disk upon one end of said sleeve adapted to engage with a clutch-collar upon the axle, a spring about said axle between the other end of the sleeve and the collar upon the axle adjacent said end of the sleeve, and means for throwing the sleeve along the axle against the action of the spring to release the clutch members, substantially as described.

In testimony whereof I have signed this specification in the presence of two subscribing witnesses.

CHARLES B. WEBSTER.

Witnesses:
H. F. CHAFFEE,
ROBERT B. REED.